United States Patent
Hong et al.

(10) Patent No.: US 9,288,390 B2
(45) Date of Patent: Mar. 15, 2016

(54) ELECTRONIC DEVICE AND METHOD FOR DRIVING CAMERA MODULE IN SLEEP MODE

(71) Applicant: Samsung Electronics Co., Ltd., Suwon-si, Gyeonggi-do (KR)

(72) Inventors: Hyun-Ju Hong, Hwaseong-si (KR); Hyung-Jin Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/105,792

(22) Filed: Dec. 13, 2013

(65) Prior Publication Data

US 2014/0168494 A1    Jun. 19, 2014

(30) Foreign Application Priority Data

Dec. 13, 2012  (KR) .......................... 10-2012-0145403

(51) Int. Cl.
  *H04N 5/232* (2006.01)
  *G06F 1/32* (2006.01)
  *G06F 1/16* (2006.01)

(52) U.S. Cl.
  CPC .......... *H04N 5/23245* (2013.01); *G06F 1/1694* (2013.01); *G06F 1/3287* (2013.01); *H04N 5/23216* (2013.01); *H04N 5/23241* (2013.01); *Y02B 60/1282* (2013.01); *Y02B 60/1289* (2013.01); *Y02B 60/32* (2013.01)

(58) Field of Classification Search
  CPC . G06F 1/1694; G06F 1/3287; H04N 5/23216; H04N 5/23241; H04N 5/23245; Y02B 60/1282
  USPC ............................................. 348/333.01, 372
  See application file for complete search history.

(56) References Cited

U.S. PATENT DOCUMENTS

| | | | |
|---|---|---|---|
| 2004/0017484 A1* | 1/2004 | Tagawa | 348/207.99 |
| 2006/0111093 A1 | 5/2006 | Shim et al. | |
| 2007/0025712 A1* | 2/2007 | Jezierski et al. | 396/56 |
| 2007/0232336 A1* | 10/2007 | Kim et al. | 455/466 |
| 2008/0132288 A1* | 6/2008 | Misawa | 455/566 |
| 2008/0211944 A1* | 9/2008 | Yamauchi | 348/294 |
| 2009/0268077 A1* | 10/2009 | Gong et al. | 348/340 |
| 2010/0013778 A1 | 1/2010 | Liu et al. | |
| 2011/0312349 A1 | 12/2011 | Forutanpour et al. | |
| 2012/0009896 A1* | 1/2012 | Bandyopadhyay et al. | 455/411 |
| 2013/0084922 A1* | 4/2013 | Liu et al. | 455/566 |

FOREIGN PATENT DOCUMENTS

| | | |
|---|---|---|
| KR | 10-2006-0095828 A | 9/2006 |
| KR | 10-0735376 B1 | 6/2007 |
| KR | 10-2008-0047827 A | 5/2008 |
| KR | 10-2011-0110937 A | 10/2011 |

* cited by examiner

*Primary Examiner* — Amy Hsu
(74) *Attorney, Agent, or Firm* — Jefferson IP Law, LLP

(57) ABSTRACT

A method for operating an electronic device which is in a first mode is provided. The method includes detecting a grip state of the electronic device, detecting a change in tilt when the detected grip state is equal to or greater than a predetermined value, and switching a mode from the first mode to a second mode when the detected change in tilt is within a set tilt range.

12 Claims, 10 Drawing Sheets

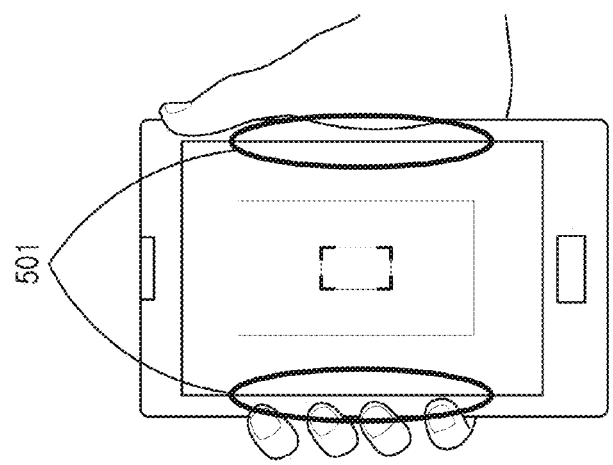
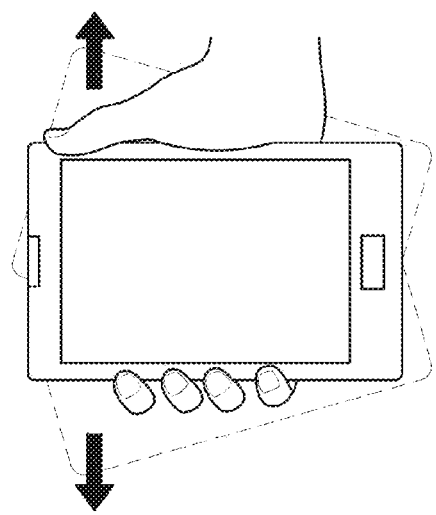
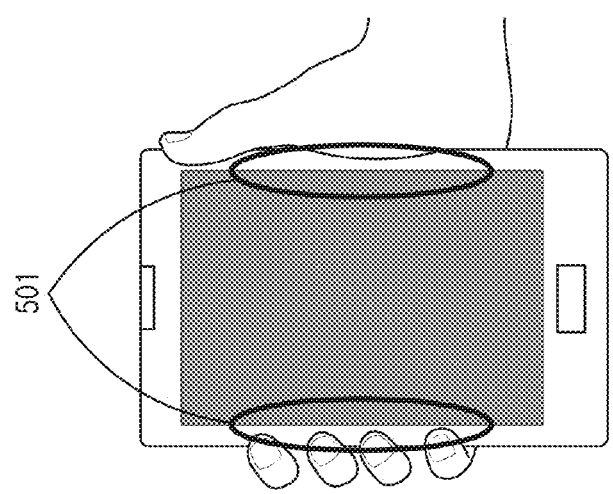

ELECTRONIC DEVICE AND METHOD FOR DRIVING CAMERA MODULE IN SLEEP MODE

CROSS-REFERENCE TO RELATED APPLICATION(S)

This application claims the benefit under 35 U.S.C. §119(a) of a Korean patent application filed on Dec. 13, 2012 in the Korean Intellectual Property Office and assigned Serial No. 10-2012-0145403, the entire disclosure of which is hereby incorporated by reference.

TECHNICAL FIELD

The present disclosure relates to a camera module in an electronic device. More particularly, the present disclosure relates to an electronic device and method for driving a camera module in a sleep module.

BACKGROUND

With the development of functions of an electronic device, the electronic device is able to perform various functions. For example, a user may use the electronic device to search news by web browsing, to download relevant applications and play various games, and to capture moving images and an image using a camera provided in the electronic device. In particular, the electronic device includes a high-performance camera, and therefore, the user may store an image having as many pixels as a high-end digital camera having professional camera functions.

However, when the electronic device is in a sleep mode, a camera module included in the electronic device may not be driven directly. That is, many interactions are required in order for a user to drive the camera module included in the electronic device which is in the sleep mode. For example, the user turns on the screen of the electronic device, inputs an unlock pattern or a password that is previously set to enter an idle mode, and select a camera module by searching stored applications.

Therefore, there is a need for an apparatus and method for directly driving a camera module without additional interactions even when an electronic device is in a sleep mode.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for directly driving a camera module without additional interactions even in a sleep mode.

Another aspect of the present disclosure is to provide an apparatus and method for driving only a camera module without turning on all modules of an electronic device in a case where a user wants to use the camera module when the electronic device is in a sleep mode, thereby reducing power consumption.

Another aspect of the present disclosure is to provide an apparatus and method for driving a camera module easily by detecting a set pressure or tilt using a grip sensor and a 9-axis sensor in a sleep mode.

Another aspect of the present disclosure is to provide an apparatus and method for performing switching to a lock screen immediately when a camera module is disabled thereby protecting a user's privacy.

In accordance to with an aspect of the present disclosure, a method for operating an electronic device which is in a first mode is provided. The method includes detecting a grip state of the electronic device, detecting a change in tilt when the detected grip state is equal to or greater than a predetermined value, and switching a mode from the first mode to a second mode when the detected change in tilt is within a set tilt range.

The first mode may be a sleep mode.

The second mode may be a mode in which only a camera module is driven in the sleep mode.

The detecting of the grip state of the electronic device may include using at least one first sensor provided in a predetermined portion to detect the grip state of the electronic device.

The first sensor may be a grip sensor.

The detecting of the change in tilt when the detected grip state is equal to or greater than the predetermined value may include using a second sensor to detect a change in spatial coordinates of x-axis, y-axis and z-axis with a central axis as an origin.

The second sensor may be a 9-axis sensor.

The switching of the mode from the first mode to the second mode when the detected change in tilt is within the set tilt range may include: determining whether the detected change in tilt is within the set tilt range, and switching the mode to a mode in which only the camera module is driven in the sleep mode when the detected change in tilt is within the set tilt range.

The method may further include receiving an input for terminating the second mode, and switching the mode from the second mode to a predetermined mode.

The predetermined mode may be a lock set mode.

In accordance with another aspect of the present disclosure, an electronic device which is in a first mode is provided. The electronic device includes a first sensor configured to detect a grip state of the electronic device, and a processor unit configured to detect a change in tilt when the detected grip state is equal to or greater than a predetermined value and to switch a mode from the first mode to a second mode when the detected change in tilt is within a set tilt range.

The first mode may be a sleep mode.

The second mode may be a mode in which only a camera module is driven in the sleep mode.

At least one first sensor may be provided in a predetermined portion to detect the grip state of the electronic device.

The first sensor may be a grip sensor.

The processor unit may use a second sensor to detect a change in spatial coordinates of x-axis, y-axis and z-axis with a central axis as an origin.

The second sensor may be a 9-axis sensor.

The processor unit may determine whether the detected change in tilt is within the set tilt range and switch the mode to a mode in which only the camera module is driven in the sleep mode when the detected change in tilt is within the set tilt range.

The electronic device may further include a touchscreen for receiving an input for terminating the second mode, wherein the processor unit may switch the mode from the second mode to a predetermined mode.

The predetermined mode may be a lock set mode.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5A, 5B, and 5C are diagrams illustrating another embodiment of driving a camera module in a sleep mode according to an embodiment of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
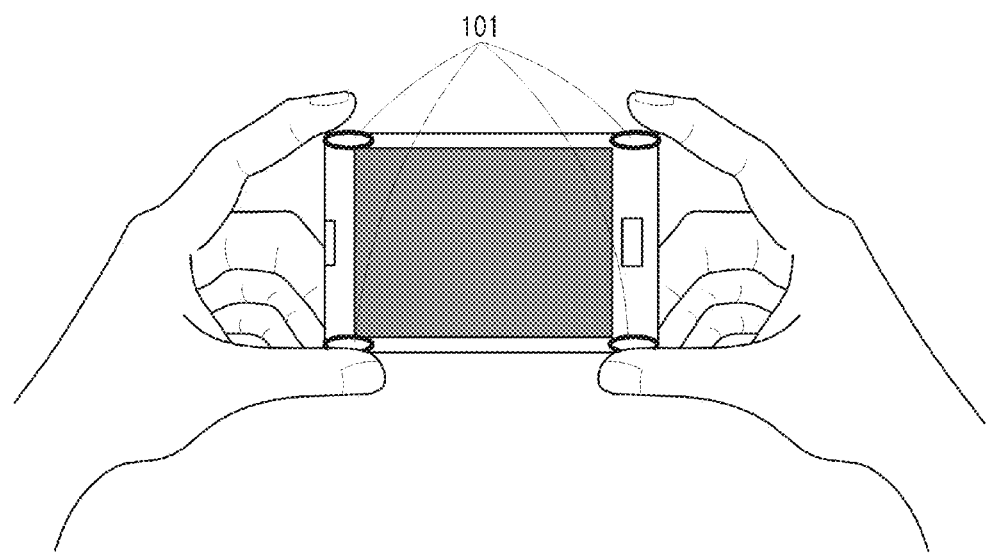
FIG. 1 is a diagram illustrating an electronic device for driving a camera module in a sleep mode according to an embodiment of the present disclosure.

FIG. 1 is a diagram illustrating an electronic device for driving a camera module in a sleep mode according to an embodiment of the present disclosure.

First, the electronic device according to the present disclosure may detect the grip state of the electronic device in a first mode. Specifically, the electronic device may use at least one first sensor provided in a predetermined portion of the electronic device to detect the grip state of the electronic device in the first mode. Herein, the first mode may be defined as a sleep mode, and at least one first sensor provided in the predetermined portion of the electronic device may be defined as a grip sensor. Specifically, the grip sensor may include a resistive touch sensor, a Capacitive (C)-type touch sensor, and a strain gauge sensor. In this case, the resistive touch sensor may be defined to recognize coordinates corresponding to a change in resistance generated by a user's input and detect a change in pressure. Furthermore, the C-type touch sensor may be defined to identify coordinates through a change in capacitance generated by the user's input. In addition, the strain gauge sensor may be defined to recognize the inner value of the sensor that is changed by a pressure generated by the user and detect a change in pressure. That is, the electronic device may use at least one grip sensor provided in a predetermined portion of the electronic device to detect a variable pressure on the electronic device in the sleep mode.

Referring to FIG. 1, the electronic device may use at least one grip sensor 101 provided in the predetermined portion of the electronic device to detect a variable pressure on the electronic device in the sleep mode.

Thereafter, when a change in pressure that is detected in the electronic device is equal to or greater than a predetermined pressure, the electronic device may detect a change in tilt. Specifically, the electronic device may use a second sensor to detect a change in spatial coordinates of x-axis, y-axis and z-axis, with the central axis of the electronic device as an origin. Herein, the second sensor may be a 9-axis sensor. Specifically, the 9-axis sensor may include an acceleration sensor, a gyro sensor and a geomagnetism sensor. Herein, the acceleration sensor is a sensor for measuring an acceleration of a moving electronic device or an impact strength, and may be defined as a sensor for measuring a dynamic force, such as an acceleration, vibration, or impact of an object. In addition, the gyro sensor is a sensor for detecting an angular velocity of the electronic device and may be defined as a sensor capable of performing detection on all three axes of x, y and z. In this case, respective axes may be defined as the x-axis (from top to bottom), the y-axis (from left to right), and the z-axis (from front to back). In addition, the geomagnetism sensor may be defined as a sensor for measuring flow of magnetic field generated in Earth and determining directions as in a compass. That is, the electronic device may use the second sensor, that is, the 9-axis sensor to detect a change in spatial coordinates of x-axis, y-axis and z-axis, with the central axis of the electronic device as an origin. For example, as illustrated in FIG. 1, the electronic device may identify that the electronic device is currently in a landscape mode using the 9-axis sensor.

Thereafter, when the electronic device identifies that a detected change in tilt is within a set tilt range, the electronic device may switch its own operating mode from the first mode to a second mode. Herein, the second mode may be defined as a mode in which only the camera module is driven in the sleep mode. Specifically, when the electronic device identifies that the detected change in tilt is within the set tilt range, the electronic device may switch the operating mode to the mode in which only the camera module is driven in the sleep mode. For example, as illustrated in FIG. 1, it is assumed that a tilt is at 0 degree when the electronic device is in a portrait mode, and a set tilt is within a range of 85 degrees to 95 degrees in the electronic device. In the above assumption, the electronic device may use the 9-axis sensor to identify that the tilt of the electronic device is currently between 85 degrees and 95 degrees which are the set tilt. After identifying that the electronic device is positioned within the set tilt range, the electronic device may switch the operating mode to the mode in which only the camera module is driven in the sleep mode.

In the related art, a camera module included in an electronic device may not be directly driven when the electronic device is in a sleep mode. That is, many interactions are required in order for a user to drive the camera module included in the electronic device which is in the sleep mode. For example, the user turns on the screen of the electronic device, inputs an unlock pattern or a password that is previously set to enter an idle mode. Thereafter the user searches at least one stored application and directly selects a camera module that the user wants to use. On the contrary, according to the present disclosure, when the electronic device is in the sleep mode, the user presses a predetermined portion of the electronic device with a pressure equal to or greater than a predetermined pressure and tilts the electronic device at a set tilt to directly drive the camera module. Therefore, when the user using the electronic device according to the present disclosure merely presses the electronic device presses the electronic device with the pressure equal to or greater than a predetermined pressure and tilts the electronic device at the set tilt without requiring many interactions, the camera module is directly driven, thereby improving the user's convenience.

Figure 2A:
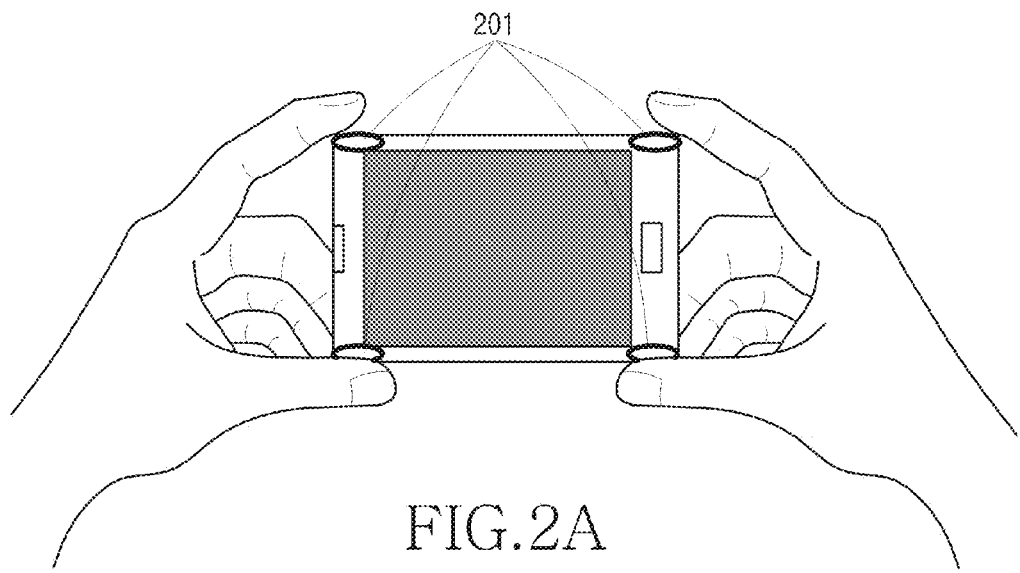
FIGS. 2A and 2B are diagrams illustrating an embodiment of driving a camera module in a sleep mode according to an embodiment of the present disclosure.
Figure 2B:
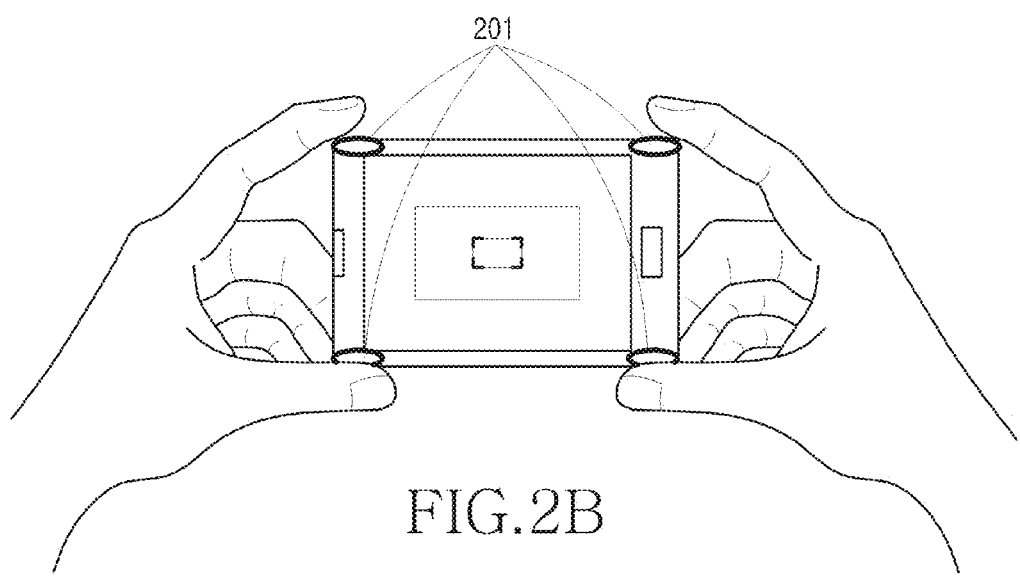

FIGS. 2A and 2B are diagrams illustrating an embodiment of driving a camera module in a sleep mode according to an embodiment of the present disclosure.

Referring to FIG. 2A, a current operating mode of the electronic device may be the sleep mode. Specifically, when the electronic device does not operate for a predetermined time interval, the electronic device may enter the sleep mode. In addition, when the predetermined time interval has elapsed in a case where the electronic device is in sleep mode, the electronic device may enter a deep sleep mode. Herein, the case in which the electronic device enters the sleep mode and the case in which the electronic device enters the deep sleep mode are both expressed as the case in which the electronic device enters the sleep mode. That is, the expression "the electronic device is in the sleep mode" may represent that the electronic device is in the deep sleep mode. The electronic device that is in the sleep mode may detect a change in pressure using at least one first sensor 201 provided in the predetermined portion of the electronic device. Herein, at least one first sensor provided in the predetermined portion of the electronic device may be defined as a grip sensor. That is, the electronic device may use at least one grip sensor provided in the predetermined portion of the electronic device to detect a variable pressure on the electronic device in the sleep mode. For example, as illustrated in FIG. 2A, the electronic device may use at least one grip sensor 201 provided in the predetermined portion of the electronic device to detect a variable pressure on the electronic device in the sleep mode.

Thereafter, when a detected change in pressure is equal to or greater than a predetermined pressure in the electronic device as illustrated in FIG. 2B, the electronic device may detect a change in tilt. Specifically, the electronic device may use a second sensor to detect a change in spatial coordinates of x-axis, y-axis and z-axis, with the central axis of the electronic device as an origin. Herein, the second sensor may be a 9-axis sensor. That is, the electronic device may use the second sensor, that is, the 9-axis sensor to detect a change in spatial coordinates of x-axis, y-axis and z-axis, with the central axis of the electronic device as an origin.

For example, referring to FIG. 2B, the electronic device may identify that the electronic device is currently in a landscape mode using the 9-axis sensor. Thereafter, when the electronic device identifies that a detected change in tilt is within a set tilt range, the electronic device may switch its own operating mode from a first mode to a second mode. Herein, the second mode may be defined as a mode in which the camera module is only driven in the sleep mode. Specifically, when the electronic device identifies that a detected change in tilt is within a set tilt range, the electronic device may switch the operating mode to the mode in which only the camera module is driven in the sleep mode. For example, as illustrated in FIG. 2B, it is assumed that a tilt is at 0 degree when the electronic device is in a portrait mode, and a set tilt is within a range of 80 degrees to 100 degrees in the electronic device. In the above assumption, the electronic device may use the 9-axis sensor to identify that the tilt of the electronic device is currently within the range of 80 degrees to 100 degrees that is a set tilt range. After identifying that the electronic device is positioned within the set tilt range, the electronic device may switch the operating mode to the mode in which only the camera module is driven in the sleep mode. Therefore, the electronic device may receive an instruction for capturing an image or moving images and capture an image or moving images in a certain direction. That is, when a user presses the electronic device with a pressure equal to or greater than the predetermined pressure when the electronic device is in the sleep mode and tilts the electronic device at the tilt that is within the set tilt range of 80 degrees to 100 degrees, the electronic device directly enters a state in which the camera module is driven.

Figure 3A:
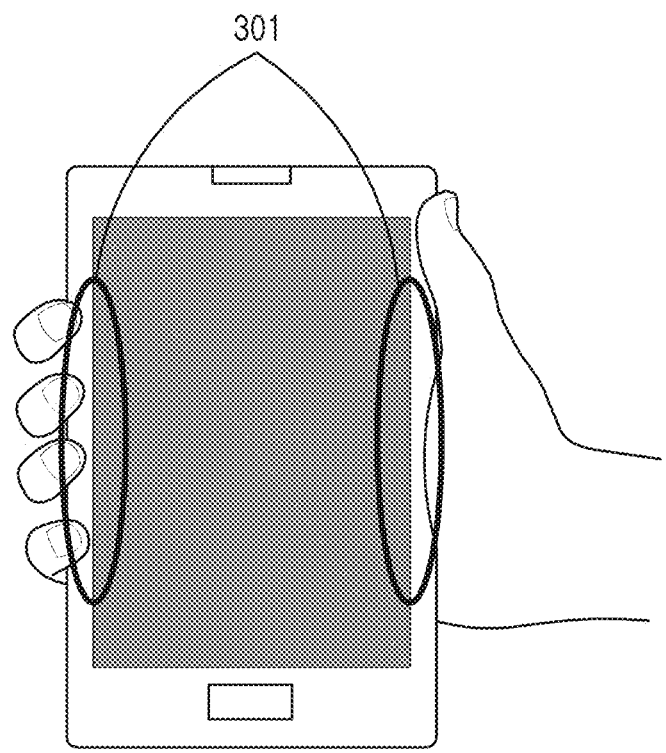
FIGS. 3A and 3B are diagrams illustrating another embodiment of driving a camera module in a sleep mode according to an embodiment of the present disclosure.
Figure 3B:
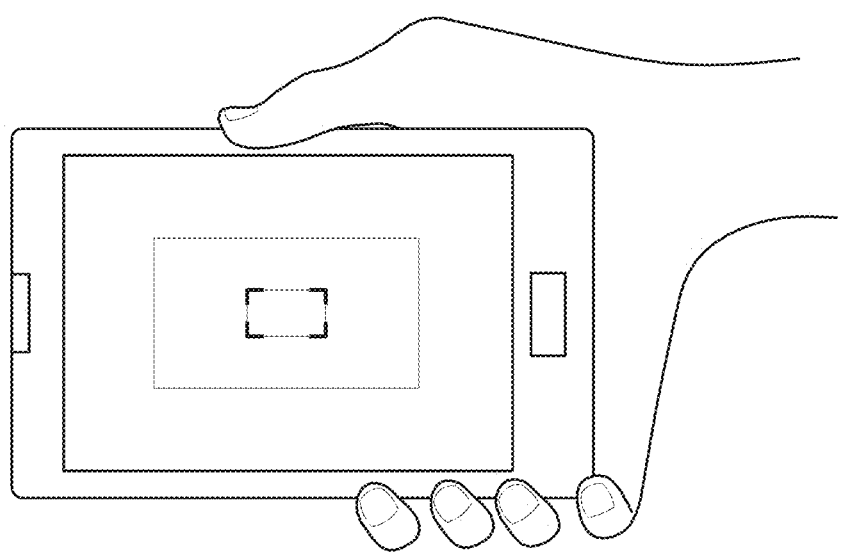

FIGS. 3A and 3B are diagrams illustrating another embodiment of driving a camera module in a sleep mode according to an embodiment of the present disclosure.

Referring to FIG. 3A, a current operating mode of the electronic device may be a sleep mode. Specifically, when the electronic device does not operate for a predetermined time interval, the electronic device may enter a sleep mode. In this case, the case in which the electronic device enters the sleep mode and the case in which the electronic device enters the deep sleep mode both are expressed as entering the sleep mode. That is, the expression "the electronic device is in the sleep mode" may represent that the electronic device is in the deep sleep mode. The electronic device that is in the sleep mode may use at least one first sensor 301 provided in the predetermined portion of the electronic device to detect a change in pressure. Herein, at least one first sensor provided in the predetermined portion of the electronic device may be defined as a grip sensor. That is, the electronic device may use at least one grip sensor provided in a predetermined portion of the electronic device to detect a variable pressure on the electronic device in the sleep mode. For example, as illustrated in FIG. 3A, the electronic device may use at least one grip sensor 301 provided in the predetermined portion of the electronic device to detect a variable pressure on the electronic device in the sleep mode. Thereafter, when a detected change in pressure is equal to or greater than a predetermined pressure, the electronic device may detect a change in tilt. Specifically, the electronic device may use a second sensor to detect a change in spatial coordinates of x-axis, y-axis and z-axis, with the central axis of the electronic device as an origin. Herein, the second sensor may be a 9-axis sensor. That is, the electronic device may use the second sensor, that is, the 9-axis sensor to detect a change in spatial coordinates of x-axis, y-axis and z-axis, with the central axis of the electronic device as an origin. For example, as illustrated in FIG. 3A, the electronic device may identify that the electronic device is currently in a portrait mode using the 9-axis sensor.

Thereafter, referring to FIG. 3B, when identifying that the detected change in tilt is within a set tilt range, the electronic device may switch its own operating mode from a first mode to a second mode. Herein, the second mode may be defined as a mode in which only the camera module is only driven in the sleep mode. Specifically, when the electronic device identifies that a detected change in tilt is within the set tilt range, the electronic device may switch the operating mode to the mode in which only the camera module is driven in the sleep mode. For example, it is assumed that a tilt is at 0 degree when the electronic device is in a portrait mode, and a set tilt is within a range of 80 degrees to 100 degrees in the electronic device. In the above assumption, the electronic device may use the 9-axis sensor to identify that the tilt of the electronic device is currently within the range of 80 degrees to 100 degrees that is the set tilt range from an initial tilt of 0 degree. After identifying that the electronic device is positioned within the set tilt range, the electronic device may switch the operating mode to the mode in which only the camera module is driven in the sleep mode. Therefore, the electronic device may receive an instruction for capturing an image or moving images and capture an image or moving images in a certain direction. That is, when a user presses the electronic device with a pressure equal to or greater than the predetermined pressure in the sleep mode and tilts the electronic device at the set tilt within the set tilt range of 80 degrees to 100 degrees, the electronic device directly enters a state in which the camera module is driven.

Figure 4C:
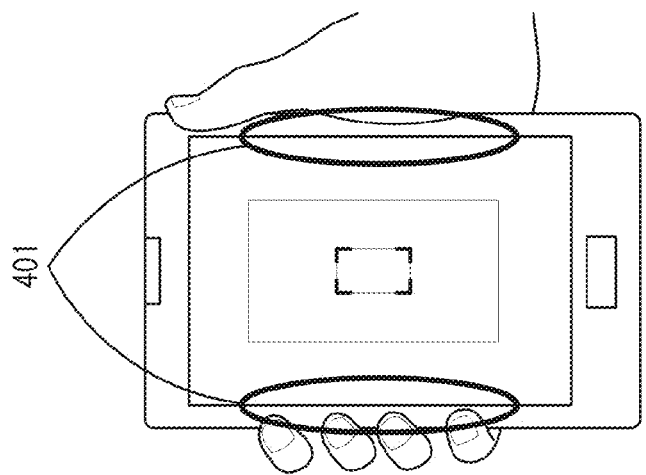
FIGS. 4A, 4B, and 4C are diagrams illustrating another embodiment of driving a camera module in a sleep mode according to an embodiment of the present disclosure.
Figure 4B:
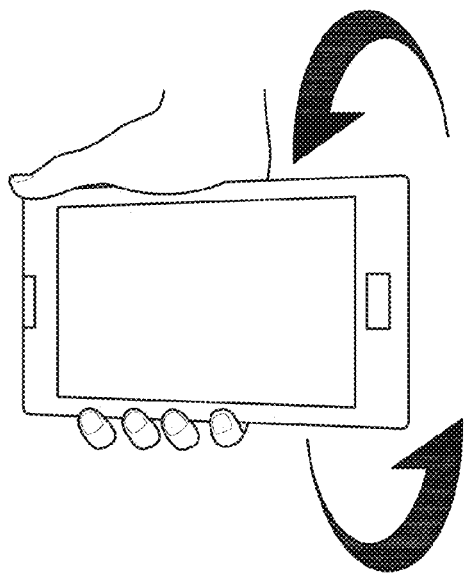
Figure 4A:
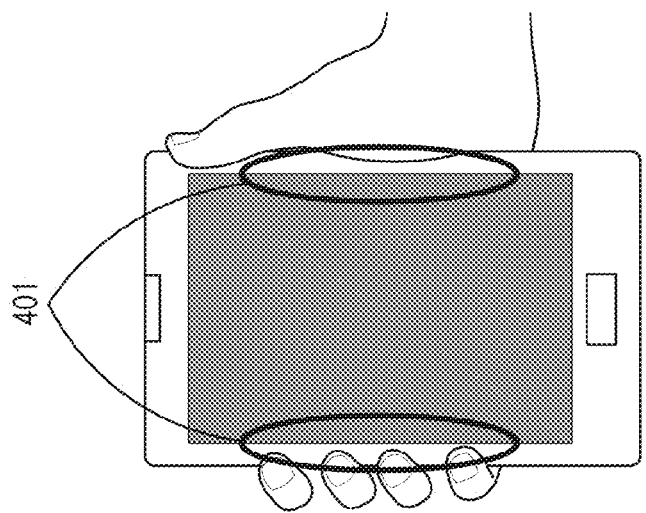

FIGS. 4A to 4C are diagrams illustrating another embodiment of driving a camera module in a sleep mode according to an embodiment of the present disclosure.

Referring to FIG. 4A, a current operating mode of the electronic device may be a sleep mode. Specifically, when the electronic device does not operate for a predetermined time interval, the electronic device may enter the sleep mode. Herein, the case in which the electronic device enters the sleep mode and the case in which the electronic device enters the deep sleep mode are both expressed as the case in which the electronic device enters the sleep mode. The electronic device that is in the sleep mode may use at least one first sensor 401 provided in the predetermined portion of the electronic device to detect a change in pressure. That is, the electronic device may use at least one grip sensor provided in a predetermined portion of the electronic device to detect a variable pressure on the electronic device in the sleep mode. For example, as illustrated in FIG. 4A, the electronic device may use at least one grip sensor 401 provided in the predetermined portion of the electronic device to detect a variable pressure on the electronic device in the sleep mode.

Thereafter, referring to FIG. 4B, when a detected change in the pressure is equal to or greater than a predetermined pressure in the electronic device, the electronic device may detect a change in tilt. Specifically, the electronic device may use the second sensor to detect a change in spatial coordinates of x-axis, y-axis and z-axis, with a central axis as an origin. Herein, the second sensor may be a 9-axis sensor. That is, the electronic device may use the second sensor, that is, the 9-axis sensor to detect a change in spatial coordinates of x-axis, y-axis and z-axis, with the central axis of the electronic device as an origin. For example, as illustrated in FIG. 4B, the electronic device may identify that the electronic device is currently rotated clockwise or counterclockwise using the 9-axis sensor.

Thereafter, referring to FIG. 4C, when the electronic device identifies that the detected change in tilt is within a set tilt range, the electronic device may switch its own operating mode from a first mode to a second mode. Herein, the second mode may be defined as a mode in which only the camera module is driven in the sleep mode. Specifically, when the electronic device identifies that a detected change in tilt is within the set tilt range, the electronic device may switch the operating mode to the mode in which only the camera module is driven in the sleep mode. For example, it is assumed that a tilt is at 0 degree when the electronic device is in a portrait mode, and a set tilt refers to a case where the electronic device is rotated clockwise or counterclockwise. In the above assumption, the electronic device may use the 9-axis sensor to identify the set tilt, that is, the state where the electronic device is currently rotated clockwise or counterclockwise from an initial tilt of 0 degree. After identifying the set tilt, that is, the state where the electronic device is rotated clockwise or counterclockwise, the electronic device may switch the operating mode to the mode in which only the camera module is driven in the sleep mode. Therefore, the electronic device may receive an instruction for capturing an image or moving images and capture an image or moving images in a certain direction. That is, when a user presses the electronic device with a pressure equal to or greater than the predetermined pressure in the sleep mode and rotates the electronic device to the set tilt, that is, clockwise or counterclockwise, the electronic device directly enters the mode in which the camera module is driven.

FIGS. 5A to 5C are diagrams illustrating another embodiment of driving a camera module in a sleep mode according to an embodiment of the present disclosure.

Referring to FIG. 5A, a current operating mode of the electronic device may be a sleep mode. Specifically, when the electronic device does not operate for a predetermined time interval, the electronic device may enter the sleep mode. Herein, the case in which the electronic device enters the sleep mode and the case in which the electronic device enters the deep sleep mode both are both expressed as the case in which the electronic device enters the sleep mode. The electronic device that is in the sleep mode may use at least one first sensor 501 provided in a predetermined portion of the electronic device to detect a change in pressure. That is, the electronic device may use at least one grip sensor provided in the predetermined portion of the electronic device to detect a variable pressure on the electronic device in the sleep mode. For example, as illustrated in FIG. 5A, the electronic device may use at least one grip sensor 501 provided in the predetermined portion of the electronic device to detect a variable pressure on the electronic device in the sleep mode.

Thereafter, referring to FIG. 5B, when a detected change in pressure is equal to or greater than a predetermined pressure in the electronic device, the electronic device may detect a change in tilt. Specifically, the electronic device may use the second sensor to detect a change in spatial coordinates of x-axis, y-axis and z-axis, with a central axis as an origin. Herein, the second sensor may be a 9-axis sensor. That is, the electronic device may use the second sensor, that is, the 9-axis sensor to detect a change in spatial coordinates of x-axis, y-axis and z-axis, with the central axis of the electronic device as an origin. For example, as illustrated in FIG. 5B, the electronic device may identify that the electronic device is currently rotated in a left or right direction using the 9-axis sensor.

Referring to FIG. 5C, when the electronic device identifies that the detected change in tilt is within a set tilt range, the electronic device may switch its own operating mode from a first mode to a second mode. Herein, the second mode may be defined as a mode in which only the camera module is driven in the sleep mode. Specifically, when the electronic device identifies that a detected change in tilt is within the set tilt range, the electronic device may switch the operating mode to the mode in which only the camera module is driven in the sleep mode. For example, it is assumed that a tilt is at 0 degree when the electronic device is in a portrait mode and, a set tilt refers to a case where the electronic device is rotated in a left or right direction. In the above assumption, the electronic device may use the 9-axis sensor to identify the set tilt, that is, the state where the electronic device is currently rotated in the left or right direction from an initial tilt of 0 degree. After identifying the set tilt, that is, the state where the electronic device is rotated in the left or right direction, the electronic device may switch the operating mode to the mode in which only the camera module is driven in the sleep mode. Therefore, the electronic device may receive an instruction for capturing an image or moving images and capture an image or moving images in a certain direction. That is, when a user presses the electronic device with a pressure equal to or greater than the predetermined pressure in the sleep mode and rotates the electronic device to the set tilt, that is, in the left or right direction, the electronic device directly enters the mode in which the camera module is driven.

Figure 6A:
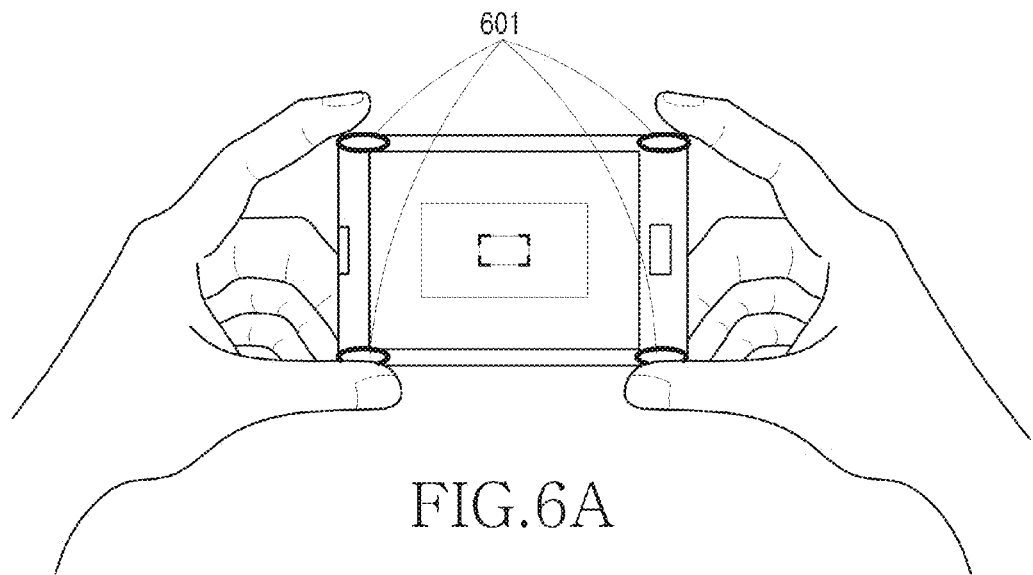
FIGS. 6A and 6B are diagrams illustrating an embodiment of receiving an input for terminating a second mode and performing switching to a predetermined mode according to an embodiment of the present disclosure.
Figure 6B:
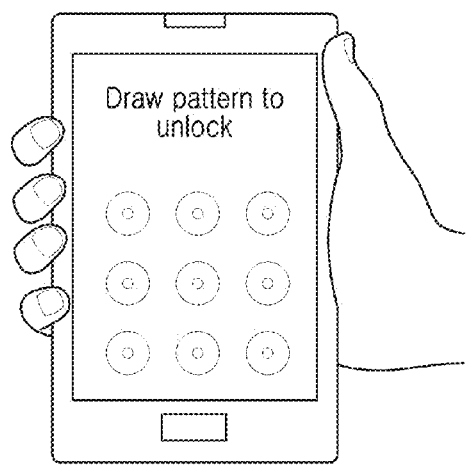

FIGS. 6A and 6B are diagrams illustrating an embodiment of receiving an input for terminating a second mode and performing switching to a predetermined mode according to an embodiment of the present disclosure.

Referring to FIGS. 6A and 6B, the electronic device according to the present disclosure may perform switching to a predetermined mode when a second mode is terminated in the state of a first mode. Specifically, in a case where an input for disabling a camera module is received when the electronic device is in a sleep mode, the electronic device may switch its own mode from a mode in which the camera module is driven to the predetermined mode. Herein, the electronic device may use at least one grip sensor 601 provided in the predetermined portion of the electronic device to detect a variable pressure on the electronic device as an input for disabling the camera module. Here, the predetermined mode may be defined as a lock set mode. That is, when the input for disabling the camera module is received, the electronic device may be switched to a lock screen state. The reason for this is that the electronic device according to the present disclosure may be switched directly from the sleep mode to a mode in which only the camera module is driven without a user authentication process. Specifically, in a case where all modules or applications of the electronic device become executable when the electronic device receives the input for disabling the camera module, the user's privacy may be violated, and therefore, the electronic device may enter the lock screen state. For example, when the camera module has been driven and thereafter, the input for disabling the camera module is received, the electronic device may enter the predetermined mode that is the lock screen state. Therefore, the electronic device may enter an idle mode only when an unlock pattern or a predetermined password is input, thereby protecting the user's privacy. As a result, the electronic device according to the present disclosure may easily drive the camera module when the electronic device is in the sleep mode, and enter the lock screen state again when the input for disabling the camera module is received, thereby rapidly driving the camera module and simultaneously protecting the user's privacy.

Figure 7:
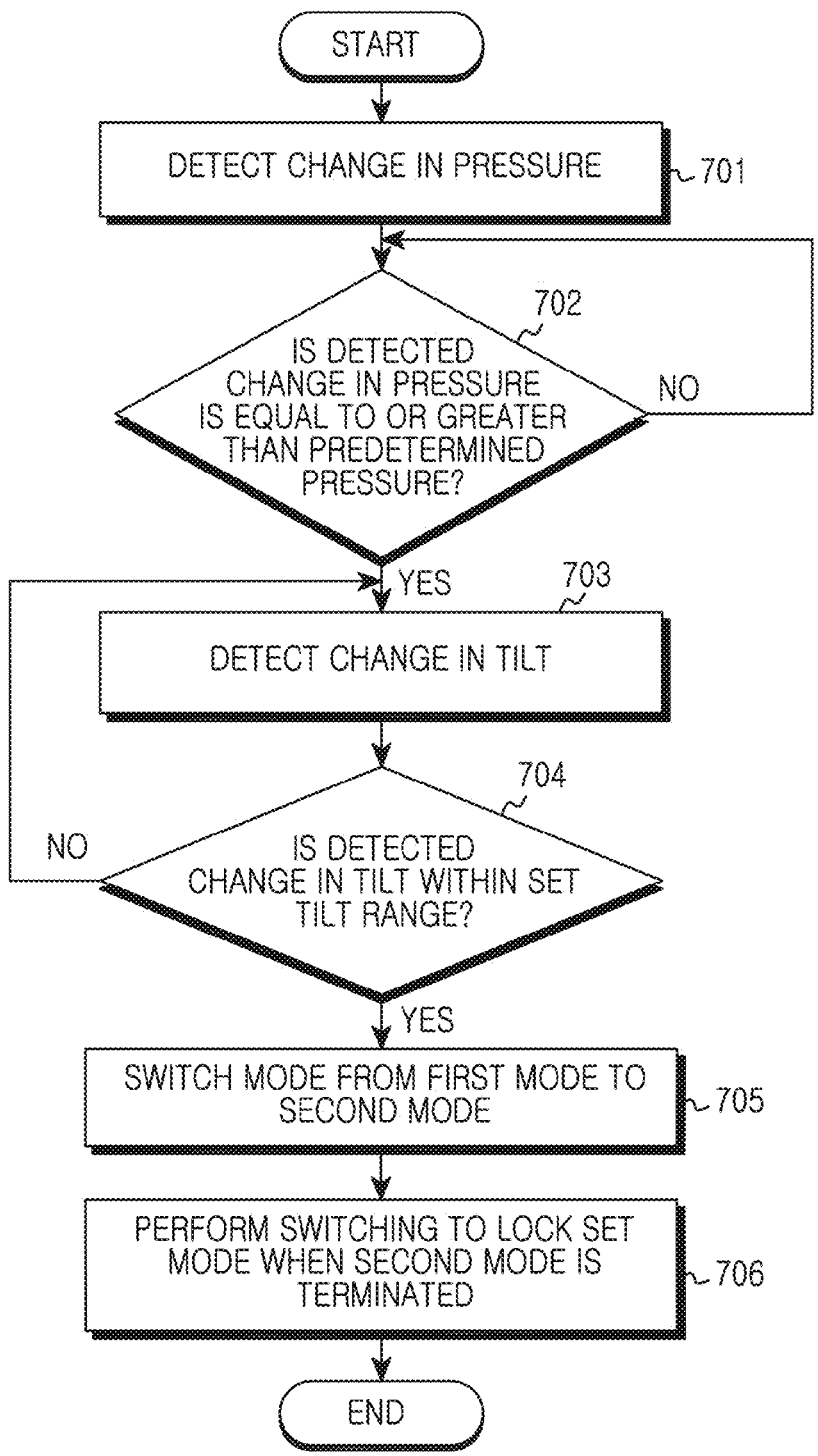
FIG. 7 is a flowchart illustrating an operation sequence of an electronic device according to an embodiment of the present disclosure.

FIG. 7 is a flowchart illustrating an operation sequence of an electronic device according to an embodiment of the present disclosure.

Referring to FIG. 7, in operation 701, the electronic device may detect a change in pressure. Specifically, the electronic device may use at least one first sensor provided in a predetermined portion of the electronic device to detect the change in pressure in a first mode. Herein, the first mode may be defined as a sleep mode, and the at least one sensor provided in the predetermined portion of the electronic device may be defined as a grip sensor. Specifically, the grip sensor may include a resistive touch sensor, a C-type touch sensor, and a strain gauge sensor. In this case, the resistive touch sensor may be defined to recognize coordinates corresponding to a change in resistance generated by a user's input and detect a change in pressure. Furthermore, the C-type touch sensor may be defined to identify coordinates according to a change in capacitance generated by the user's input to detect a change in pressure. In addition, the strain gauge sensor may be defined to recognize the inner value of the sensor that is changed by a pressure generated by the user and detect a change in pressure. That is, the electronic device may use at least one grip sensor provided in a predetermined portion of the electronic device to detect a variable pressure on the electronic device in the sleep mode.

In operation 702, the electronic device may determine whether a detected change in pressure is equal to or greater than a predetermined pressure. Specifically, the electronic device may determine whether the detected change in pressure is equal to or greater than the predetermined pressure by using at least one grip sensor provided in the predetermined portion. For example, the electronic device may determine whether the detected change in pressure is equal to or greater than the predetermined pressure by including at least one grip sensor at the left, right, upper or lower portion, or left, right, upper or lower corner of the electronic device.

When the detected change in pressure is equal to or greater than the predetermined pressure, the electronic device may detect a change in tilt in operation 703. Specifically, the electronic device may use the second sensor to detect a change in spatial coordinates of x-axis, y-axis and z-axis, with a central axis as an origin. Herein, the second sensor may be a 9-axis sensor. Specifically, the 9-axis sensor may include an acceleration sensor, a gyro sensor and a geomagnetism sensor. Herein, the acceleration sensor is a sensor for measuring an acceleration of a moving electronic device or an impact strength, and may be defined as a sensor for measuring a dynamic force, such as an acceleration, vibration, impact of an object. In addition, the gyro sensor is a sensor for detecting an angular velocity of the electronic device and may be defined as a sensor capable of performing detection on all three axes of x, y and z. In this case, respective axes may be defined as the x-axis (from top to bottom), the y-axis (from left to right), and the z-axis (from front to back). In addition, the geomagnetism sensor may be defined as a sensor for measuring flow of magnetic field generated in Earth and determining directions as in a compass. That is, the electronic device may use the second sensor, that is, the 9-axis sensor to detect a change in spatial coordinates of x-axis, y-axis and z-axis, with the central axis of the electronic device as an origin.

In operation 704, the electronic device, which has detected the change in tilt, determines whether the detected change in tilt is within a set tilt range. For example, it is assumed that a tilt is at 0 degree when the electronic device is in a portrait mode, and a set tilt is within a range of 85 degrees to 95 degrees in the electronic device. In the above assumption, the electronic device may use the 9-axis sensor to identify that the tilt of the electronic device is currently between 85 degrees to 95 degrees that are the set tilt.

When the electronic device identifies that the detected change in tilt is within the set tilt range, the electronic device may switch its own operating mode from a first mode to a second mode in operation 705. Herein, the first mode may be defined as a sleep mode, and the second mode may be defined as a mode in which only the camera module is driven in the sleep mode. Specifically, when the electronic device identifies that the detected change in tilt is within set tilt range, the electronic device may switch the operating mode to the mode in which only the camera module is driven in the sleep mode. For example, it is assumed that a tilt is at 0 degree when the electronic device is in a portrait mode and, a set tilt is within a range of 85 degrees to 95 degrees in the electronic device. In the above assumption, the electronic device may use the 9-axis sensor to identify that the tilt of the electronic device is currently between 85 degrees and 95 degrees which are the set tilt. After identifying that the electronic device is positioned within the set tilt range, the electronic device may switch the operating mode to the mode in which only the camera module is driven in the sleep mode.

In operation 706, when the second mode is terminated, the electronic device may be switched to a lock set mode. Specifically, in a case where an input for disabling the camera module is received when the electronic device is in the sleep mode, the electronic device may switch the operating mode from the mode in which the camera module is driven to a predetermined mode. Herein, the predetermined mode may be defined as a lock set mode. That is, when the input for disabling the camera module is received, the electronic device may perform switching to a lock screen state. The reason for this is that the electronic device according to the present disclosure may be switched directly to the mode in which only the camera module is driven without a user authentication process. Specifically, in a case where all modules or applications of the electronic device become executable when the electronic device receives the input for disabling the camera module, the user's privacy may be violated, and therefore, the electronic device may enter the lock screen state. For example, when the camera module has been driven, and thereafter, the input for disabling the camera module is received, the electronic device may enter the predetermined mode, that is, the lock screen state. Therefore, the electronic device may enter an idle mode only when an unlock pattern or a predetermined password is input, thereby protecting the user's privacy. As a result, the electronic device according to the present disclosure may easily drive the camera module in the sleep mode and enter the lock screen state again when the input for disabling the camera module is received, thereby rapidly driving the camera module and simultaneously protecting the user's privacy.

When the electronic device determines that a change in pressure detected by the electronic device is not equal to or greater than a predetermined pressure in the above-described determination in operation 702, the electronic device may repeatedly perform the determination in operation 702 until the detected change in pressure is equal to or greater than the predetermined pressure. When the electronic device determines that the change in tilt detected by the electronic device is not within a set tilt range in the above-described determination in operation 704, the electronic device may repeatedly perform the tilt in operation 703 of detecting a change in tilt of electronic device.

Figures 8A, 8B:
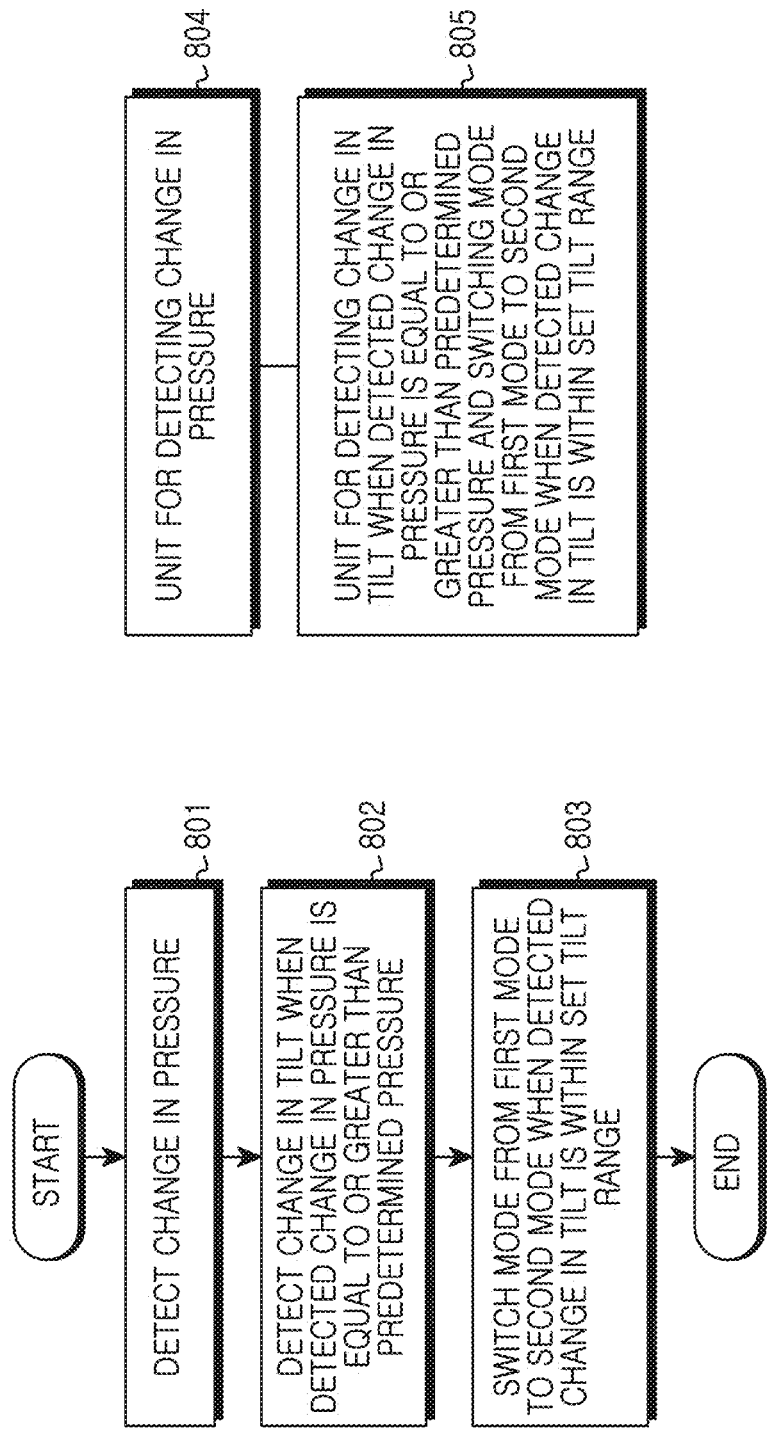
FIG. 8A is a flowchart illustrating a method for an electronic device according to an embodiment of the present disclosure.
FIG. 8B is a diagram illustrating a configuration of an electronic device according to an embodiment of the present disclosure.

FIG. 8A is a flowchart illustrating a method for an electronic device according to an embodiment of the present disclosure.

Referring to FIG. 8A, first, in operation 801, the electronic device may detect a change in pressure. Specifically, the electronic device may use at least one first sensor provided in a predetermined portion of the electronic device to detect a change in pressure in a first mode. Herein, the first mode may be defined as a sleep mode, and at least one first sensor provided in the predetermined portion of the electronic device may be defined as a grip sensor. Specifically, the grip sensor may include a resistive touch sensor, a C-type touch sensor, and a strain gauge sensor. In this case, the resistive touch sensor may be defined to recognize coordinates corresponding to a change in resistance generated by a user's input and detect a change in pressure. Furthermore, the C-type capacitive touch sensor may be defined to identify coordinates according to a change in capacitance generated by the user's input to detect a change in pressure. In addition, the strain gauge sensor may be defined to recognize the inner value of the sensor that is changed by a pressure generated by the user and detect a change in pressure. That is, the electronic device may use at least one grip sensor provided in the predetermined portion of the electronic device to detect a variable pressure on the electronic device in the sleep mode.

In operation 802, the electronic device may detect a change in tilt when the detected change in pressure is equal to or greater than a predetermined pressure. Specifically, the electronic device may use the second sensor to detect a change in spatial coordinates of x-axis, y-axis and z-axis, with a central axis as an origin. Herein, the second sensor may be a 9-axis sensor. Specifically, the 9-axis sensor may include an acceleration sensor, a gyro sensor and a geomagnetism sensor. Herein, the acceleration sensor is a sensor for measuring an acceleration of a moving electronic device or impact strength, and may be defined as a sensor for measuring a dynamic force, such as acceleration, vibration, impact of an object. In addition, the gyro sensor is a sensor for detecting an angular velocity of the electronic device and may be defined as a sensor capable of performing detection on all three axes of x, y and z. In this case, respective axes may be defined as the x-axis (from top to bottom), the y-axis (from left to right), and the z-axis (from front to back). In addition, the geomagnetism sensor may be defined as a sensor for measuring flow of magnetic field generated in Earth and determining directions as in a compass. That is, the electronic device may use the second sensor, that is, the 9-axis sensor to detect a change in spatial coordinates of x-axis, y-axis and z-axis, with the central axis of the electronic device as an origin.

In operation 803, when the electronic device identifies that the detected change in tilt is within a set tilt range, the electronic device may switch its own mode from the first mode to a second mode. Herein, the second mode may be defined as a mode in which only the camera module is driven in the sleep mode. Specifically, when the electronic device identifies that the detected change in tilt is within the set tilt range, the electronic device may switch the operating mode to the mode in which only the camera module is driven in the sleep mode. For example, it is assumed that a tilt is at 0 degree when the electronic device is in a portrait mode, and a set tilt refers to a case where the electronic device is rotated clockwise or counterclockwise. In the above assumption, the electronic device may use the 9-axis sensor to identify the set tilt, that is, the state where the electronic device is currently rotated clockwise or counterclockwise from an initial tilt of 0 degree. After identifying the set tilt, that is, the state where the electronic device is rotated clockwise or counterclockwise, the electronic device may switch the operating mode to the mode in which only the camera module is driven in the sleep mode. Therefore, the electronic device may receive an instruction for capturing an image or moving images and capture an image or moving images in a certain direction. That is, when a user presses the electronic device with a pressure equal to or greater than the predetermined pressure in the sleep mode and rotates the electronic device to the set tilt, that is, clockwise or counterclockwise, the electronic device directly enters the mode in which the camera module is driven.

FIG. 8B is a diagram illustrating a configuration of an electronic device according to an embodiment of the present disclosure.

Referring to FIG. 8B, a unit 804, such as a grip sensor of the electronic device, may be included. The unit 804 may detect a change in pressure in operation 804. Specifically, the unit 804 may be provided in a predetermined portion of the electronic device and may detect a change in pressure in a first mode. Herein, the first mode may be defined as a sleep mode, and at least one first sensor provided in the predetermined portion of the electronic device may be defined as a grip sensor. That is, the unit 804 may be provided in a predetermined portion of the electronic device and may detect a variable pressure in the sleep mode.

A unit 805, such as a processor unit, may be provided for detecting change in tilt when detecting change in pressure is equal to or greater than predetermined pressure and switching mode from first mode to second mode when detected change in tilt is within set tilt range. The unit 805 may detect a change in tilt when the detected change in pressure is equal to or greater than a predetermined pressure, and switch its own mode from the first mode to a second mode when the detected change in tilt is within a set tilt range. Herein, the second mode may be defined as a mode in which only the camera module is driven in the sleep mode. Specifically, when the unit 805 identifies that the detected change in tilt is within the set tilt range, the unit 805 may switch the operating mode to the mode in which only the camera module is driven in the sleep mode. For example, it is assumed that a tilt is at 0 degree when the electronic device is in a portrait mode and a set tilt refers to a case where the electronic device is rotated clockwise or counterclockwise. In the above assumption, the unit 805 may use the 9-axis sensor to identify the set tilt, that is, the state where the electronic device is currently rotated clockwise or counterclockwise from an initial tilt of 0 degree. After identifying the set tilt, that is, the state where the electronic device is rotated clockwise or counterclockwise, the unit 805 may switch the operating mode to the mode in which only the camera module is driven in the sleep mode. Therefore, the electronic device may receive an instruction for capturing an image or moving images and capture an image or moving images in a certain direction.

Figure 9:
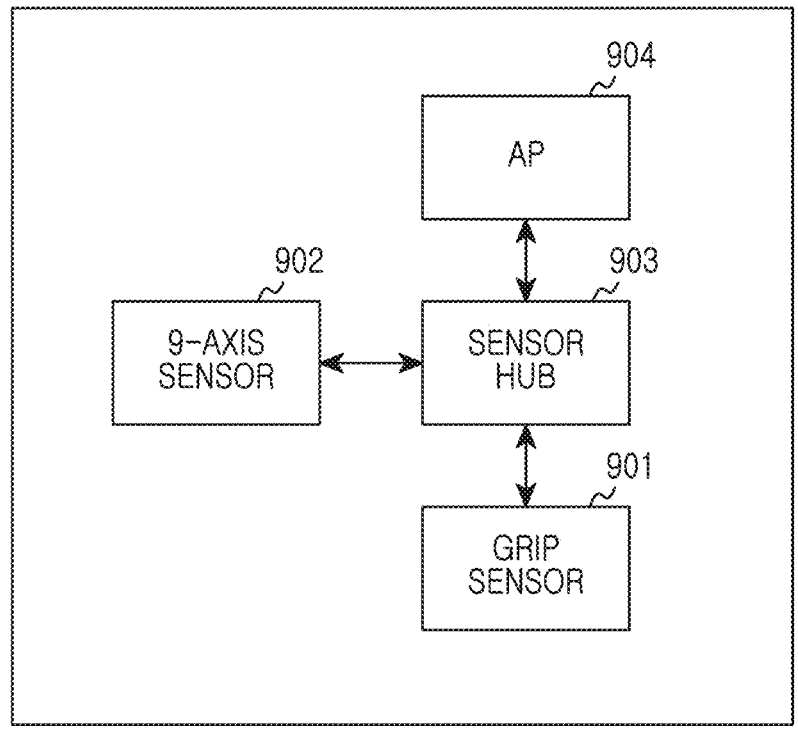
FIG. 9 is a block diagram illustrating a configuration of an electronic device according to an embodiment of the present disclosure.

FIG. 9 is a block diagram illustrating a configuration of an electronic device according to an embodiment of the present disclosure.

Referring to FIG. 9, the electronic device according to the present disclosure may include a grip sensor 901, a 9-axis sensor 902, a sensor hub 903, and an Application Processor (AP) 904. First, the grip sensor 901 may be provided in a predetermined portion of the electronic device and may detect a variable pressure on the electronic device. Specifically, at least one grip sensor 901 may be provided in the predetermined portion of the electronic device and may determine whether the variable pressure on the electronic device is equal to or greater than a predetermined pressure. When the grip sensor 901 detects a pressure equal to or greater than the predetermined pressure, the grip sensor 901 may transmit a signal indicating that the pressure equal to or greater than the predetermined pressure is detected to the sensor hub 903.

The 9-axis sensor 902 may be provided in the electronic device and may detect a variable tilt and motion of the electronic device. Specifically, the 9-axis sensor 902 is disabled in the sleep mode usually. When the grip sensor 901 detects the pressure equal to or greater than the predetermined pressure, the 9-axis sensor 902 may be driven to determine whether the pressure is within a set tilt range. When the 9-axis sensor 902 determines that the changed tilt is within the set tilt range as a result of real-time determination for the variable tilt, the 9-axis sensor 902 may transmit a signal indicating that the tilt of the electronic device is within the set tilt range to the sensor hub 903.

The sensor hub 903 is connected among the grip sensor 901, the 9-axis sensor 902 and the AP 904. When receiving, from the 9-axis sensor 902 and the AP 904, the signal indicating that the pressure equal to or greater than the predetermined pressure is detected and the signal indicating that the tilt is within the set tilt range, the sensor hub 903 may wake up the AP 904 that is in the sleep mode to drive the AP 904. Specifically, the sensor hub 903 may wake up the AP 904 that is in the sleep mode to drive the AP 904 only when the above-described two conditions are satisfied, thereby reducing battery consumption in the electronic device.

The AP 904 controls the electronic device entirely. The AP 904 is usually in a sleep state and, only when receiving an urgent instruction for capturing images, is driven. Specifically, when receiving the urgent instruction for capturing images from the sensor hub 903, the AP 904 may drive only the camera module (not shown) of the electronic device to drive the camera module. Therefore, the AP 904 may drive only the camera module when receiving the urgent instruction for capturing images from the sensor hub 903, thereby reducing battery consumption in the electronic device.

Figure 10:
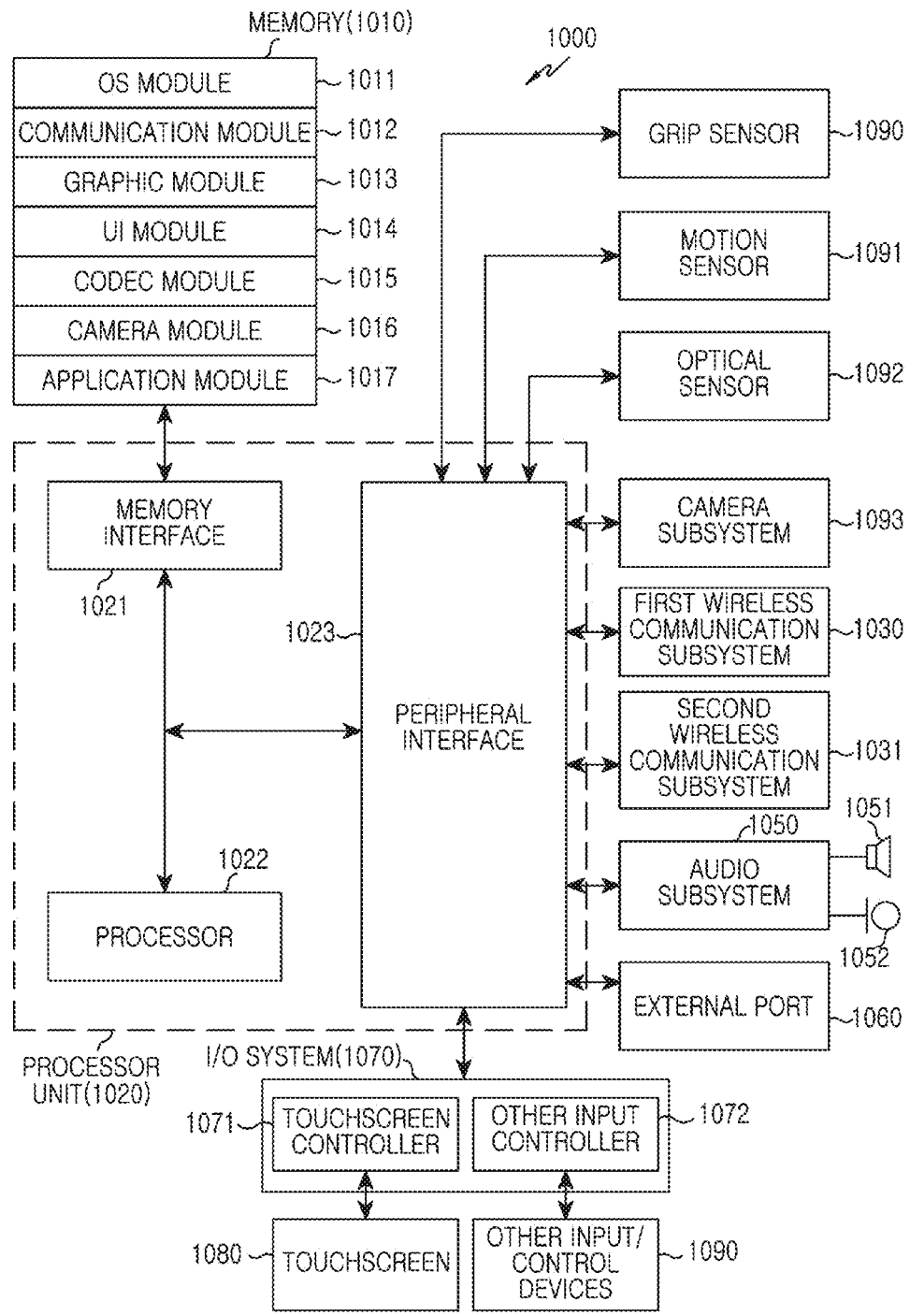
FIG. 10 is a block diagram illustrating a configuration of an electronic device according to an embodiment of the present disclosure.

FIG. 10 is a block diagram illustrating a configuration of an electronic device according to an embodiment of the present disclosure.

Such an electronic device 1000 may be a portable electronic device, and examples thereof may include a portable terminal, a mobile phone, a mobile pad, a media player, a tablet computer, a handheld computer, or a Personal Digital Assistant (PDA). In addition, the electronic device may be any one portable electronic device including a device having two or more functions among the above-described devices.

Referring to FIG. 10, the electronic device 1000 includes a memory 1010, a processor unit 1020, a first wireless communication subsystem 1030, a second wireless communication subsystem 1031, an external port 1060, an audio subsystem 1050, a speaker 1051, a microphone 1052, an Input/Output (I/O) system 1070, a touchscreen 1080, and other input/control devices 1090. The memory unit 1010 and the external port 1060 may be provided in plurality. The electronic device 1000 may also include a grip sensor 1090, a motion sensor 1091, an optical sensor 1092, and a camera subsystem 1093.

The processor unit 1020 may include a memory interface 1021, at least one processor 1022, and a peripheral interface 1023. In some cases, the processor unit 1020 will also be referred to as a processor. According to the present disclosure, the processor unit 1020 detects a change in tilt when a detected change in pressure is equal to or greater than a predetermined pressure, and switches its own mode from a first mode to a second mode when the detected change in tilt is within a set tilt range. In addition, the processor unit 1020 may use a second sensor to detect a change in spatial coordinates of x-axis, y-axis and z-axis with a central axis as an origin, and switch an operating mode to a mode in which only a camera module is driven in a sleep mode when identifying that the detected change in tilt is within the set tilt range. In addition, the processor unit 1020 may switch the operating mode from the second mode to a predetermined mode.

The processor 1022 executes various software programs to perform various functions for the electronic device 1000, and performs processes and controls for voice communication and data communication. In addition to these general functions, the processor 1022 executes a specific software module (instruction set) stored in the memory 1010 and performs various specific functions corresponding to the software module. That is, the processor 1022 performs methods of embodiments according to the present disclosure in cooperation with software modules stored in the memory 1010.

The processor 1022 may include at least one data processor, image processor, or codec. The data processor, the image processor, or the codec may be configured separately. In addition, the processor 1022 may be configured by a plurality of processors performing different functions. The peripheral interface 1023 connects various peripheral devices and the I/O subsystem 1070 of the electronic device 1000 to the processor 1022 and the memory 1010 (through the memory interface).

The various components of the electronic device 1000 may be coupled by at least one communication bus (not illustrated) or stream line (not illustrated).

The external port 1060 is used for connection to other electronic devices directly or indirectly through a network (for example, Internet, intranet, or wireless Local Area Network (LAN)). The external port 1060 may be, for example, a Universal Serial Bus (USB) port or a FireWire port, but is not limited thereto.

The grip sensor 1094, the motion sensor 1091 and the optical sensor 1092 may be connected to the peripheral interface 1023 to enable various functions. For example, the motion sensor 1091 and the optical sensor 1092 may be connected to the peripheral interface 1023 to detect a motion of the electronic device and detect light from the outside. In addition, other sensors such as a positioning system, a temperature sensor, and a biosensor may be connected to the peripheral interface 1023 to perform relevant functions. At least one grip sensor 1090 is provided in a predetermined portion and detects a change in pressure. In addition, the motion sensor 1091 detects a tilt.

The camera subsystem 1093 may perform camera functions such as photographing and video clip recording.

The optical sensor 1092 may include a Charged Coupled Device (CCD) or a Complementary Metal-Oxide Semiconductor (CMOS) device.

A communication function is performed through one or more wireless communication subsystems 1030 and 1031. The wireless communication subsystems 1030 and 1031 may include a Radio Frequency (RF) receiver and transceiver and/or an optical (e.g., infrared) receiver and transceiver. The first wireless communication subsystem 1030 and the second wireless communication subsystem 1031 may be divided according to communication networks through which the electronic device 1000 communicate. For example, the communication networks may include, but are not limited to, a Global System for Mobile Communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a Wireless Fidelity (WiFi) network, a WiMax network, and/or a Bluetooth network. The first wireless communication subsystem 1030 and the second wireless communication subsystem 1031 may be integrated with each other as one wireless communication subsystem.

The audio subsystem 1050 is connected to the speaker 1051 and the microphone 1052 to perform audio stream input/output functions such as voice recognition, voice replication, digital recording, and phone functions. That is, the audio subsystem 1050 communicates with the user through the speaker 1051 and the microphone 1052. The audio subsystem 1050 receives a data stream through the peripheral interface 1020 of the processor unit 1023 and converts the received data stream into an electric stream. The electric stream is transmitted to the speaker 1051. The speaker 1051 converts the electric stream into sound waves audible by humans and outputs the same. The microphone 1052 converts sound waves received from humans or other sound sources into an electric stream. The audio subsystem 1050 receives an electric stream converted from the microphone 1052. The audio subsystem 1050 converts the received electric stream into an audio data stream and transmits the audio data stream to the peripheral interface 1023. The audio subsystem 1050 may include an attachable/detachable earphone, a headphone, or a headset.

The I/O subsystem 1070 may include a touchscreen controller 1071 and/or another input controller 1072. The touchscreen controller 1071 may be connected to the touchscreen 1080. The touchscreen 1080 and the touchscreen controller 1071 may detect a touch, a motion, or a stop thereof by using multi-touch detection technologies including a proximity sensor array or other elements, as well as capacitive, resistive, infrared and surface acoustic wave technologies for determining one or more touch points on the touchscreen 1080. The other input controller 1072 may be connected to the other input/control devices 1090. The other input/control devices 1090 may include one or more buttons, a rocker switch, a thumb-wheel, a dial, a stick, and/or a pointer device such as a stylus.

The touchscreen 1080 provides an I/O interface between the electronic device 1000 and the user. That is, the touchscreen 1080 transmits a user touch input to the electronic device 1000. Also, the touchscreen 1080 is a medium that displays an output from the electronic device 1000 to the user. That is, the touchscreen 1080 displays a visual output to the user. The visual output may be represented by a text, a graphic, a video, or a combination thereof.

The touchscreen 1080 may use various display technologies. For example, the touchscreen 1080 may use a Liquid Crystal Display (LCD), a Light Emitting Diode (LED), a Light Emitting Polymer Display (LPD), an Organic Light Emitting Diode (OLED), an Active Matrix Organic Light Emitting Diode (AMOLED), or a Flexible LED (FLED). The touchscreen 1080 of the present disclosure receives an input for terminating the second mode.

The memory 1010 may be connected to the memory interface 1021. The memory unit 1010 may include one or more high-speed Random-Access Memories (RAMs) such as magnetic disk storage devices, one more nonvolatile memories, one or more optical storage devices, and/or one or more flash memories (for example, NAND flash memories or NOR flash memories).

The memory 1010 stores software. Components of the software include an Operation System (OS) module 1011, a communication module 1012, a graphic module 1013, a User Interface (UI) module 1014, a codec module 1015, a camera module 1016, and one or more application modules 1017. Also, since the module that is a software component may be represented as a set of instructions, the module may be referred to as an instruction set. The module may also be referred to as a program. The OS software 1011 (for example, WINDOWS, LINUX, Darwin, RTXC, UNIX, OS X, or an embedded OS such as VxWorks) includes various software components for controlling general system operations. For example, general system operation controls may include memory control/management, storage hardware (device) control/management, and power control/management. The OS software 1011 also performs a function for enabling smooth communication between various hardware components (devices) and software components (modules).

The communication module 1012 may enable communication with other electronic devices (such as computers, servers, and/or portable terminals) through the wireless communication subsystems 1030 and 1031 or the external port 1060.

The graphic module 1013 includes various software components for providing and displaying graphics on the touchscreen 1080. The graphics include texts, web pages, icons, digital images, videos, and animations. In the present disclosure, the touchscreen 1080 displays a message about whether a smart rotation function is set, and receives a selection of a region included in the message.

The UI module 1014 includes various software components related to a user interface. Through the user interface module, the electronic device provides information about how the state of a user interface changes and/or information about under what condition the state of a user interface changes.

The codec module 1015 may include software components related to video file encoding/decoding. The codec module may include a video stream module such as a Moving Picture Experts Group (MPEG) module or an H204 module. Also, the codec module may include various audio file codec modules such as Advanced Audio Coding (AAC), Adaptive Multi-Rate (AMR), and Windows Media Audio (WMA). Also, the codec module 1015 includes an instruction set corresponding to the implementation methods of the present disclosure.

The camera module 1016 may include camera-related software components that enable camera-related processes and functions.

The application module 1017 may include a browser application, an electronic (e)-mail application, an instant message application, a word processing application, a keyboard emulation application, an address book application, a touch list application, a widget application, a Digital Right Management (DRM) application, a voice recognition application, a voice replication application, a position determining function application, a Location-Based Service (LBS) application, and the like.

In addition, it will be appreciated that embodiments of the present disclosure according to the claims and description in the specification can be realized in the form of hardware, software or a combination of hardware and software. Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure. Any such software may be stored in the form of volatile or non-volatile storage such as, for example, a storage device like a Read Only Memory (ROM), whether erasable or rewritable or not, or in the form of memory such as, for example, RAM, memory chips, device or integrated circuits or on an optically or magnetically readable medium such as, for example, a Compact Disc (CD), Digital Versatile Disc (DVD), magnetic disk or magnetic tape or the like. It will be appreciated that the storage devices and storage media are embodiments of machine-readable storage that are suitable for storing a program or programs comprising instructions that, when executed, implement embodiments of the present disclosure. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device which is in a first mode, the method comprising:
   detecting, by the electronic device, a grip state of the electronic device;
   detecting, by the electronic device, a change in tilt when the detected grip state is equal to or greater than a predetermined value;
   switching, by the electronic device, a mode from the first mode to a second mode without user authentication when the detected change in tilt is within a set tilt range;
   receiving, by the electronic device, an input for terminating the second mode; and
   switching, by the electronic device, the mode from the second mode to a predetermined mode,
   wherein the first mode is a sleep mode, the second mode is a mode in which only a camera module is driven in the sleep mode, and the predetermined mode is a lock set mode.

2. The method of claim 1, wherein the detecting of the grip state of the electronic device comprises using at least one first sensor provided in a predetermined portion of the electronic device to detect the grip state of the electronic device.

3. The method of claim 1, wherein the first sensor is a grip sensor.

4. The method of claim 1, wherein the detecting of the change in tilt when the detected grip state is equal to or greater than the predetermined value comprises using a second sensor to detect a change in spatial coordinates of x-axis, y-axis and z-axis with a central axis as an origin.

5. The method of claim 4, wherein the second sensor is a 9-axis sensor.

6. The method of claim 1, wherein the switching of the mode from the first mode to the second mode when the detected change in tilt is within the set tilt range comprises:
   determining whether the detected change in tilt is within the set tilt range; and
   switching the mode to a mode in which only the camera module is driven in the sleep mode when the detected change in tilt is within the set tilt range.

7. An electronic device which is in a first mode, the electronic device comprising:
   a first sensor configured to detect a grip state of the electronic device; and a processor unit configured to:
- detect a change in tilt when the detected grip state is equal to or greater than a predetermined value,
- switch a mode from the first mode to a second mode without user authentication when the detected change in tilt is within a set tilt range,
- receive an input for terminating the second mode, and
- switch the mode from the second mode to a predetermined mode,
- wherein the first mode is a sleep mode, the second mode is a mode in which only a camera module is driven in the sleep mode, and the predetermined mode is a lock set mode.

8. The electronic device of claim 7, wherein at least one first sensor is provided in a predetermined portion of the electronic device to detect the grip state of the electronic device.

9. The electronic device of claim 7, wherein the first sensor is a grip sensor.

10. The electronic device of claim 7, wherein the processor unit is configured to use a second sensor to detect a change in spatial coordinates of x-axis, y-axis and z-axis with a central axis as an origin.

11. The electronic device of claim 10, wherein the second sensor is a 9-axis sensor.

12. The electronic device of claim 7, wherein the processor unit is configured to:
- determine whether the detected change in tilt is within the set tilt range, and
- switch the mode to a mode in which only the camera module is driven in the sleep mode when the detected change in tilt is within the set tilt range.

* * * * *